(No Model.)
A. V. RYDER.
CULTIVATOR TOOTH.
No. 523,597. Patented July 24, 1894.
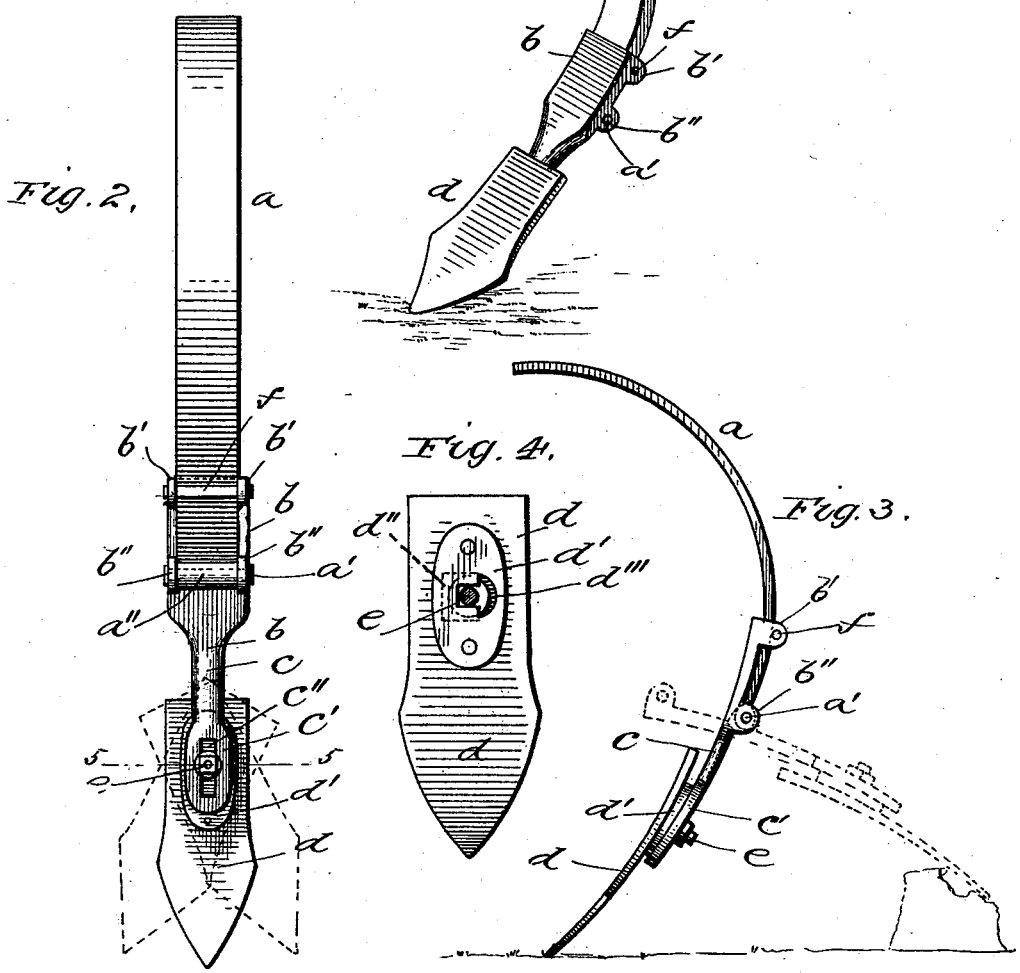

UNITED STATES PATENT OFFICE.

ANDREW V. RYDER, OF BELLEVUE, OHIO.

CULTIVATOR-TOOTH.

SPECIFICATION forming part of Letters Patent No. 523,597, dated July 24, 1894.

Application filed October 7, 1893. Serial No. 487,462. (No model.)

*To all whom it may concern:*

Be it known that I, ANDREW V. RYDER, a citizen of the United States, residing at Bellevue, in the county of Huron and State of Ohio, have invented certain new and useful Improvements in Cultivator-Teeth, of which the following is a specification, reference being had therein to the accompanying drawings.

This invention relates to a new and improved spring cultivator-tooth; and it has for its objects to provide means whereby the tooth will be permitted to pass over obstructions which present resistance enough to damage the ordinary spring tooth if dragged bodily over them, to so form the parts of the tooth that they may be cheaply manufactured, and to provide means whereby the shovel of the tooth may be adjusted in various ways to adapt the tooth to the various kinds of plant cultivation.

In the drawings:—Figure 1 is a perspective view of my improved tooth. Fig. 2 is a rear view thereof. Fig. 3 is a side elevation. Fig. 4 is a detail of the shovel; and Fig. 5 is a cross-section on line 5—5 of Fig. 2.

Referring to the various parts by letter, $a$ designates the curved spring-shank of the tooth, but this shank may be straight and rigid if desired; $b$ the rigid extension which is hinged to the lower end of the shank $a$ by the pin $a'$, which passes through the rearwardly-extending ears $b''$ (formed on each side of said extension and embracing the side edges of the shank), and through the enlargement $a''$ on the lower end of the shank $a$; this enlargement may be made by turning the spring shank back upon itself or in any other suitable way.

$b'$ are rearwardly-extending ears formed on each side of the extension $b$ at its upper end above the ears $b''$, these ears also embracing the side edges of the shank $a$; $f$ the breakpin which passes through the ears $b'$ and bears on the rear side of the shank $a$ as clearly shown in Fig. 2; $c$ the narrowed and rounded portion of the extension $b$, which is formed thereon below the lower end of the shank $a$, and $c'$ a portion of the extension $b$ at its lower end which is formed slightly larger than the portion $c$ thereof and provided with the longitudinal slot $c''$; $d$ the shovel-blade which is adjustably secured to the lower end of the extension $b$; $d'$ a plate rigidly secured to the rear side of the blade $d$ and formed with the socket $d''$, said socket having an entrance opening $d'''$ in the plate $d'$; $e$ a bolt whose head enters the socket $d''$ and whose shank extends rearwardly through the slot $c''$ of the extension $b$, a nut being secured on its outer end to securely bind the shovel blade to the extension.

The operation of my improved device is as follows:—The pin $f$ is formed of some suitable breakable metal of a breaking strength less than any part of the tooth and said pin passes through the ears $b'$ and bears against the rear side of the shank $a$, the extension $b$ having previously been hinged to the shank in the manner described, its upper end bearing against the front side of the shank. The shovel $d$ is secured to the extension by the devices described, and as will be readily understood is capable of adjustment either up or down on the extension by means of the slot $c''$ therein, and it is also capable of adjustment to throw the soil to or from the plants as desired, by turning it on its bolt $e$ as shown in Fig. 2. When in operation the blade strikes an obstruction which would damage and usually break the ordinary spring tooth, the pin $f$ will break and relieve the spring shank of the strain and permit the extension to turn on its pivot-pin $a'$, thus permitting the shovel-blade to swing back and pass over the obstruction, as shown in dotted lines in Fig. 3. In order to restore the tooth to working position again it is necessary to simply swing the extension into place again and insert a pin $f$ in the ears $b'$.

I wish it understood that any suitable device may be employed to adjustably secure the shovel blade to the extension, and I therefore do not wish to limit myself to the device shown and described.

Having thus fully described my invention, what I claim is—

A cultivator tooth consisting of a flat spring shank formed with a slight enlargement at its lower end, said enlargement being apertured as shown, a rigid flat extension fitting closely against the front side of the shank, lugs $b'$ and $b''$ formed on said extension, said lugs embracing the side edges of the shank, a pivot pin $a'$ passing through the lugs $b''$ and through the aperture in the enlargement at the lower end of the shank, a break-pin $f$ passing through the lugs $b'$ and bearing on the rear side of the spring shank above the pivot pin, and a rotatably and vertically adjustable shovel-blade secured to the lower end of the extension, substantially as described and for the purpose set forth.

In testimony whereof I affix my signature in presence of two witnesses.

ANDREW V. RYDER.

Witnesses:
GEORGE H. WITHEY,
SAML. P. BOARDMAN.